United States Patent [19]

Riedel et al.

[11] Patent Number: 5,473,632
[45] Date of Patent: Dec. 5, 1995

[54] METHOD OF DETERMINING THE COMPLEX PULSE RESPONSE OF A RADIO SYSTEM

[75] Inventors: Peter Riedel; Martin Stumpf, both of Munich; Otmar Wanierke, Arnsbach, all of Germany

[73] Assignee: Rohde & Schwarz GmbH & Co., Munich, Germany

[21] Appl. No.: 259,570

[22] Filed: Jun. 14, 1994

Related U.S. Application Data

[63] Continuation of Ser. No. 969,929, Oct. 29, 1992, abandoned.

[30] Foreign Application Priority Data

Oct. 31, 1991 [DE] Germany .......................... 41 35 953.4

[51] Int. Cl.⁶ .............................. H04B 3/46; H04B 17/00
[52] U.S. Cl. ...................... 375/228; 375/259; 375/340; 375/342; 375/350; 370/17; 455/67.7
[58] Field of Search .................................. 375/10, 93, 94, 375/103, 224, 228, 340, 342, 350, 259; 371/43, 44, 45, 46; 370/17; 455/67.1, 67.3, 67.7

[56] References Cited

U.S. PATENT DOCUMENTS

| | | | |
|---|---|---|---|
| 5,029,186 | 7/1991 | Maseng et al. | 371/43 |
| 5,191,598 | 3/1993 | Backstrom et al. | 375/94 |
| 5,224,127 | 6/1993 | Okanoue | 375/94 |

OTHER PUBLICATIONS

"Ein System für Ausbreitungsmessungen in MobilfunkkanälenGrundlagen und Realisierung", by S. Hermann, U. Martin, R. Reng, H. W. Schüßler, K. Schwarz, Kleinheubacher Berichte No. 34 (1991), pp. 615–624.

"Breitbandige Ausbreitungsmessungen zur Charakterisierung des Funkanals beim GSM-System", by G. Kadal, R. W. Lorenz, Frequenz No. 45 (1991) pp. 158–163.

"Neues Verfahren zur Messung der Kanalstoßantwort und Trägersynchronisation in digitalen Mobilfunkkanälen", by W. Plagge, D. Poppen, Frequenz 44 (1990), pp. 217–221.

"Real–Time ML Estimation of Very Frequency–Selective Multipath Channels", by J.-P. de Weck, J. Ruprecht, IEEE Global Telecommunications Conference GLOBECOM '90, (Dec. 1990), pp. 1–6.

Primary Examiner—Stephen Chin
Assistant Examiner—Amanda T. Le
Attorney, Agent, or Firm—Hill, Steadman & Simpson

[57] ABSTRACT

In order to determine the complex pulse response of a radio channel, for instance in a digital mobile radio network, signal portions of the wanted signal transmitted via the radio channel, which signal portions are preset at the receiver end, are measured and the pulse response is then calculated from the signal portions by linear transformation.

19 Claims, 2 Drawing Sheets

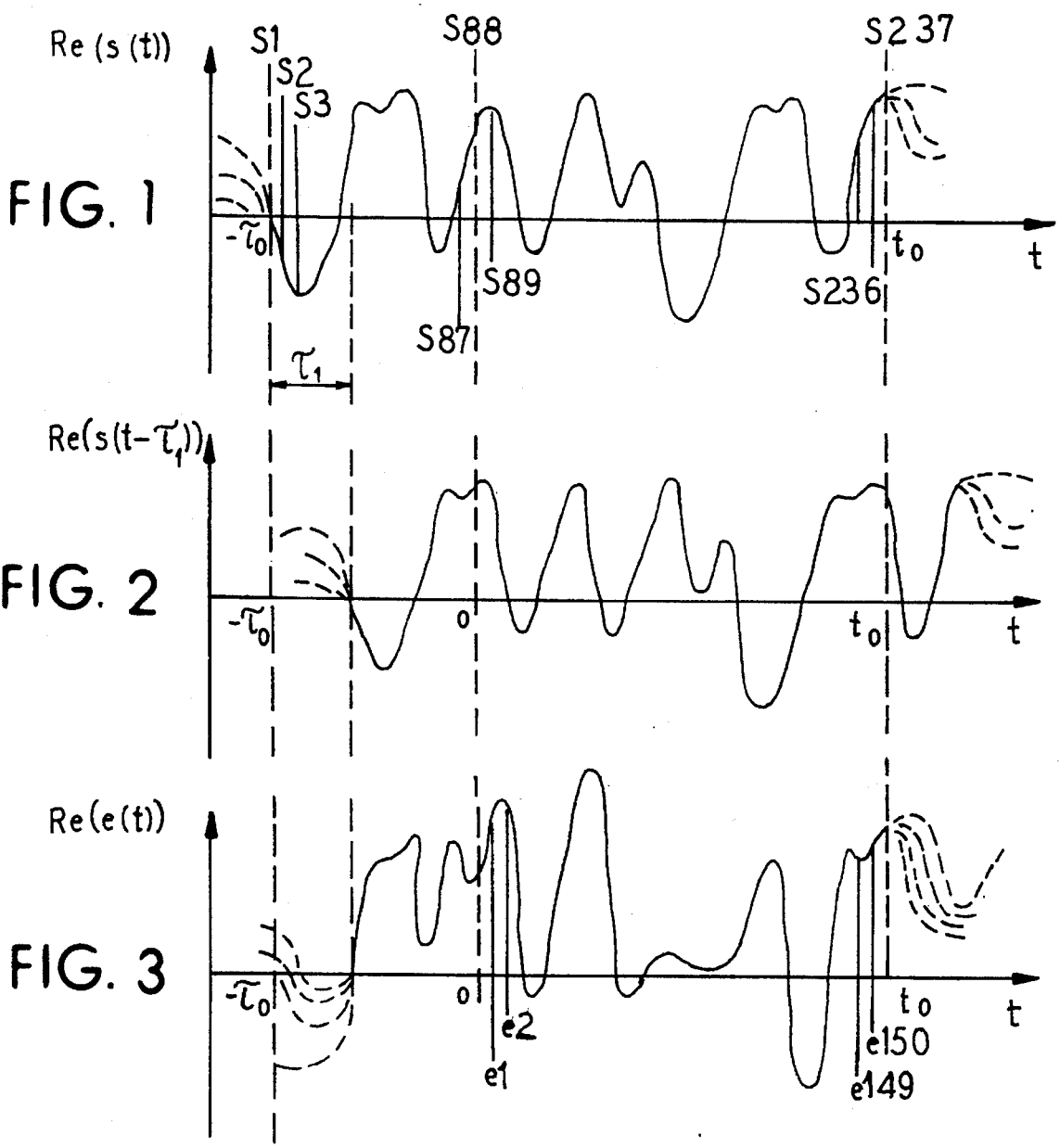

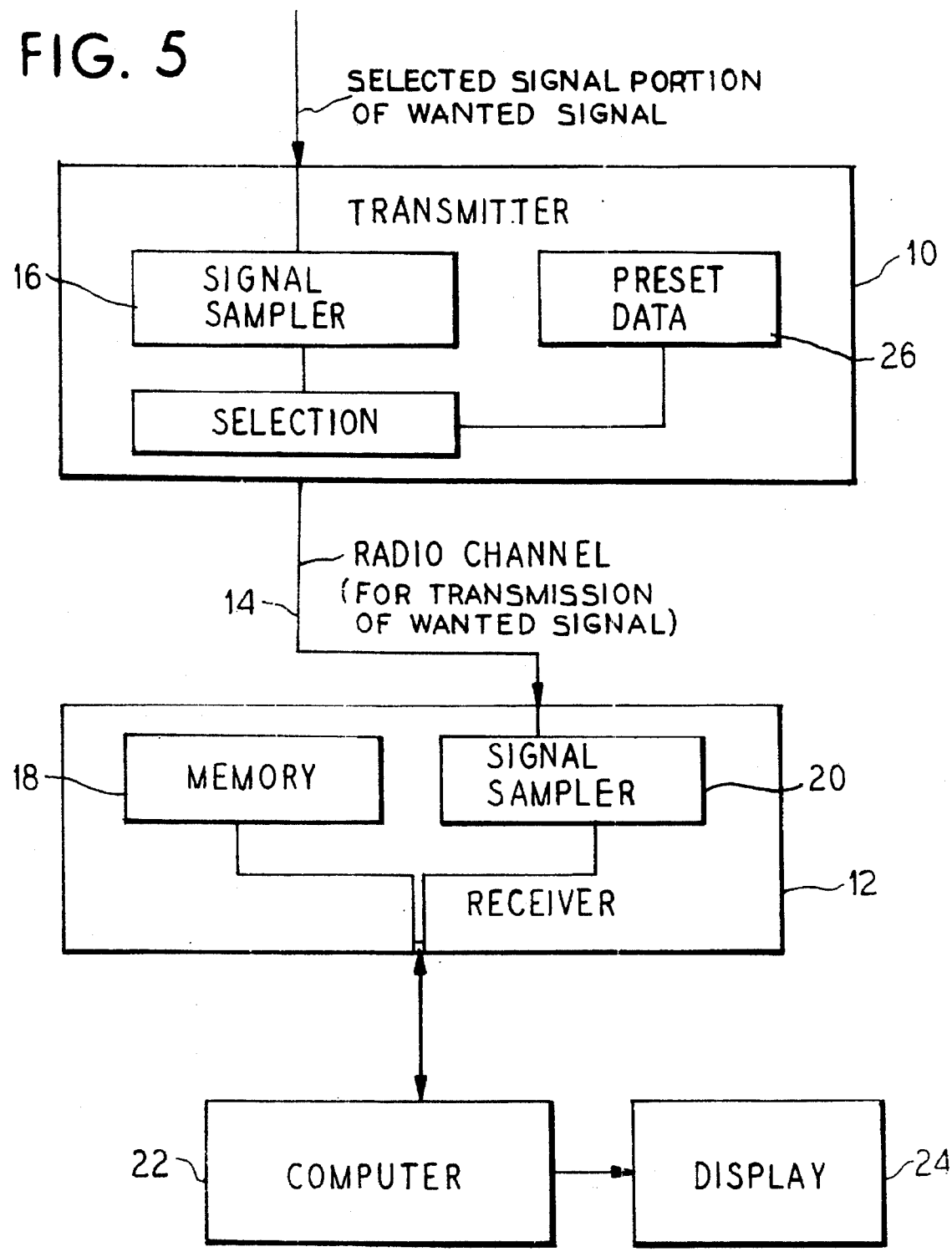

METHOD OF DETERMINING THE COMPLEX PULSE RESPONSE OF A RADIO SYSTEM

This is a continuation of application Ser. No. 969,929, filed Oct. 29, 1992, now abandoned.

BACKGROUND OF THE INVENTION

1. Field of the Invention

The present invention is directed to a method of determining complex pulse response of a radio channel, for instance the pulse response of radio channels of a digital mobile radio network (GSM network).

2. Description of the Prior Art

In radio networks in which radio signals are transmitted from one or several transmitters to a receiver, multipath propagation will result in interferences which may be expressed by the so-called complex pulse response of the radio channel. In digital mobile radio networks such as the so-called GSM radio networks such interferences due to multipath propagation appear as so-called inter-symbol interferences. When the pulse response of the radio channel is of longer duration than the duration of the bits transmitted via the radio channel, signal components of the received signal which form part of a symbol suffer from interference by components of previously transmitted symbols.

It has been known for measuring the complex pulse response to feed a special test signal by way of a specific standard signal generator into the radio channel to be measured and to determine the pulse response of the radio channel through the received signal as measured at the receiver by correlation with the transmitted test signal. This is disclosed in the following prior art references:

- (S. Hermann, U. Martin, R. Reng, H. W. Schüßler, K. Schwarz: "Ein System för Ausbreitungsmessungen in Mobilfunkkanälen-Grundlagen und Realisierung", Kleinheubacher Berichte No. 34 (1991), pp. 615–624;
- G. Kadel, R. W. Lorenz: "Breitbandige Ausbreitungsmessungen zur Charakterisierung des Funkkanals beim GSM-System", Frequenz No. 45 (1991) pp. 158–163;
- W. Plagge, D. Poppen: "Neues Verfahren zur Messung der Kanalstoßantwort und Trägersynchronisation in digitalen Mobilfunkkanälen", Frequenz 44 (1990) pp. 217–221; and
- J.-P. de Weck, J. Ruprecht: "Real-Time ML Estimation of Very Frequency-Selective Multipath Channels", IEEE Global Telecommunications Conference GLOBECOM'90, (December 1990).

The known measuring method requires a special standard signal generator at the transmitter end and is operative on condition that an unused radio channel is available. Therefore the known method is relatively expensive.

SUMMARY OF THE INVENTION

It is an object of the present invention to provide a simplified method of determining the complex pulse response of a radio channel, in particular a method in which an additional standard signal generator is not required.

The object is achieved by a method of the present invention for determining the complex pulse response $\vec{h}$ of a radio channel, especially in a digital mobile radio network. From a selected signal portion of the wanted signal transmitted via the radio channel, the matrix S of this signal portion is determined at the transmitter end from preset data of this signal portion or from sample values obtained by sampling this signal portion. At the receiver end the vector $\vec{e}$ of this signal portion is determined by sampling this selected signal portion. The pulse response is calculated by linear transformation in accordance with the following relationship:

$$\vec{h} = (S^{*T} \cdot S)^{-1} \cdot S^{*T} \cdot \vec{e}$$

where $S^{*T}$ is a transposed complex conjugate matrix of the matrix S.

In an advantageous development of the present invention a correction factor $\alpha$ with a diagonally dominant matrix E is inserted in the calculation of the pulse response in accordance with the relationship:

$$\vec{h} = (S^{*T} \cdot S + \alpha E)^{-1} \cdot S^{*T} \cdot \vec{e}$$

In a further advantageous development of the present invention the training sequence signal portion of the mobile radio network is used as the selected signal portion for determining the pulse response of a radio channel of the digital mobile radio network.

In a further advantageous development of the present invention the pulse response is calculated by linear transformation in accordance with the following relationship:

$$\vec{h} = s^{*T}(S \cdot S^{*T} + N\sigma^2 E)^{-1} \cdot \vec{e}$$

where $S^{*T}$ is a transposed complex conjugate matrix of the matrix S, N is the number of columns in the matrix S, $\sigma$ is a standard deviation of input noise and E is a diagonally dominant matrix.

In the method according to the present invention, a signal portion of the wanted signal transmitted via the radio channel is utilized for measuring and determining the complex pulse response so that any separate standard signal generator at the transmitter end is unnecessary. Moreover, in the method according to the present invention any interruption of the wanted signal transmission is unnecessary, and the measurement may be performed during normal operation of the radio network. The method of the present invention is especially suitable for measuring the pulse response of radio channels of a digital mobile radio network (GSM network). In this case it will be advantageous to perform the measurement on one of the so-called training sequence signal portions of the digital signal as they are defined for instance in "Recommendation GSM 05.02" of ETSI/PT 12 of January 1990, Section 3.4.1, for the GSM network as a digital signal and transmitted in every frame of the digital signal at a predetermined position as a preset signal portion.

With the method of the present invention, a periodic repetition of the selected signal portion is not absolutely necessary, the pulse response according to the method of the invention may also be determined only once from a single selected signal portion. However, it is preferred to perform several successive measurements with repetitive similar signal portions so that the measurement becomes more precise. It has been found particularly advantageous to perform this measurement with periodically repetitive signal portions, i.e. with signal portions which occur successively at equal time intervals, as applicable to the mentioned training sequence signal portion of the GSM network.

The invention makes use of the recognized fact that there is a linear relationship between the complex pulse response, the periodically repetitive preset signal portion of the transmitted wanted signal, and the signal measured at the receiver end, which relationship may be expressed as a matrix multiplication when considered in time-discrete fashion. It is thereby possible to calculate from the preset and the measured signals the complex pulse response in a simple way by a linear approach, and in accordance with a further improvement of the invention it has been found particularly advantageous when said calculation also takes into account a corresponding correction factor whereby errors due to noise in the measured received signal may be reduced.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 1 is a graph of an analog signal portion of a training sequence that is receive on a direct route;

FIG. 2 is a graph of a signal portion offset relative to the FIG. 1 signal portion;

FIG. 3 is a graph of a combined signal of the FIGS. 1 and 2 signals; and

FIGS. 4a–4d depict equations for solving the received signals and time-discrete pulse responses; and FIG. 5 is a block diagram of a transmitter connected to a receiver via a radio channel in a digital mobile radio network for use with the present invention.

DESCRIPTION OF THE PREFERRED EMBODIMENT

In the digital mobile radio network GSM the bits which are to be transmitted at the transmitter end are deformed so that a deformed analog signal results which may be transmitted on a small bandwidth due to frequency modulation via a radio channel. FIG. 5 schematically depicts a transmitter 10 connected to a receiver 12 via a radio channel 14 in a portion of the digital mobile radio network GSM. FIG. 1 illustrates the analog signal portion between $-T_0$ and $t_0$ known as the so-called training sequence, and other message portions indicated in dashed lines are transmitted upstream and downstream of this signal portion. It shall be assumed that the pulse response of the radio channel is not longer than $T_0$, i.e. the propagation time of a signal which is transmitted on an alternate route from the transmitter to the receiver should not be longer than $T_0$ as compared to the signal which is transmitted direct between transmitter and receiver. Since this portion between $-T_0$ and $0$ may become corrupted by the previous unknown signal portions, only the portion between $0$ and $t_0$ of the total transmitted training sequence is measured at the receiver end out of the received training sequence, and the pulse response is calculated therefrom.

FIG. 1 illustrates the signal portion received on the direct route, FIG. 2 shows the signal portion which is somewhat offset by the propagation time $T_1$ relative to the first-mentioned signal portion, and FIG. 3 illustrates the combined signal which is composed of these two signal portions and measured in the receiver. In the region between $0$ and $t_0$ there is a linear relationship between the received signal e, the signal portion s and the pulse response $\vec{h}$, which relationship may be expressed in the form of a matrix multiplication by the equation of FIG. 4a. The columns of the matrix S are the transmission sequences which are offset relative to time, the vector $\vec{h}$ is the time-discrete pulse response, and the vector $\vec{e}$ is the received signal.

Since in practical use the measured received signal exhibits more or less noise and the pulse response is not necessarily always shorter than $T_0$ and errors also occur due to the individual consideration of the continuous signals. The relationship according to FIG. 4a is not exact, but there holds the relationship according to FIG. 4b. Hence, for calculating the complex pulse response $\vec{h}$ from the measured values of the signal e, a linear approximation according to the relationship of FIG. 4c is used in which S is the matrix of the predetermined training sequence s which is set up as known per se from the vector s of the analog transmission signal s(t), $S^{*T}$ is the transposed (with interchanged rows and columns) complex conjugate matrix to the matrix S, and the vector $\vec{e}$ comprises the respectively measured samples of the received signal from 0 to $t_1$.

In practical use, these values required for the calculation of the complex pulse response $\vec{h}$ are for example obtained as follows.

The predetermined training sequence portion according to FIG. 1 between $-T_0$ and $t_0$ is digitalized at the transmitter end, i.e. from this portion 237 digital samples s1 through s237 are for instance obtained by sampling (signal sampler 1b in FIG. 5). The values s1 . . . s237 are complex. Real and imaginary portions correspond to the in-phase or quadrature components of an I/Q-demodulator required for the measurement. From these samples the matrix S is then set up for this training sequence portion in accordance with the following relationship:

$$S = \begin{bmatrix} s88 & s87 & \ldots & s1 \\ s89 & s88 & \ldots & s2 \\ . & . & \ldots & . \\ . & . & \ldots & . \\ . & . & \ldots & . \\ s237 & s236 & \ldots & s150 \end{bmatrix}$$

Another possibility of arranging the matrix S of this signal portion according to FIG. 1 at the transmitter end consists in that from the preset normal data (present data 26 in FIG. 5) of the training sequence the samples s1 . . . s237 of its analog complex envelopes are calculated.

The matrix S thus determined by measurement or by calculation is then stored in a memory means (memory 18 in FIG. 5) of a measurement receiver.

In the measurement receiver, the training sequence portion being thus preset at the receiver end before the transmission of the signal, depicted in FIG. 1, from the transmitter 10 to the receiver 12 set up at the receiver end the signal portion between 0 and $t_o$ according to FIG. 3 is again digitalized by sampling (signal sampler 20 in FIG. 5), i.e. by means of, for example, 150 sampling operations on the received signal, the individual complex sample values e1 to e150 are determined and from these digital values the vector $\vec{e}$ of the signal portion is obtained, so that the vector $\vec{e}$ is determined by the total of the sample values e1 to e150. (These are again complex so that for example e1=(Re(e1), Im(e1) can be written.)

In a computer (computer 22 in FIG. 5) which cooperates with the measurement receiver the complex pulse response $\vec{h}$ is then calculated in accordance with the formula specified in FIG. 4c from the stored matrix S, the complex conjugate matrix $S^{*T}$ and the vector $\vec{e}$.

With the method according to the invention it is therefore only required that from a signal portion of the wanted signal transmitted via the radio channel, for instance from the so-called training sequence portion of a wanted signal, the matrix S thereof is determined at the transmitter end and the vector $\vec{e}$ of the receiver-end signal portion is determined by sampling at the receiver end and then the pulse response is calculated therefrom by computation in accordance with the specified equation. The calculated pulse response may then be displayed (display 24 in FIG. 5) directly as a graph or may be stored for further use in a memory means. It is thereby possible without any interruption of the radio traffic operation for instance of a mobile radio network to determine and to analyze the signal transmission quality in the various radio channels. For the measurement at the receiver end any receiver will be suitable from the demodulated analog signal from which as shown in FIG. 3 the vector $\vec{e}$ may be determined direct by sampling.

This relationship, however, will only be a good approximation for the channel pulse response $\vec{h}$ if noise is not taken into account.

Hence, in accordance with a further improvement of the present invention the pulse response is calculated by using the relationship specified in FIG. 4d according to which an additional positive correction factor $\alpha$ with a diagonally dominant identity matrix E is inserted. Thereby, errors due to noise in the received signal are compensated and optimum noise suppression is achieved. The factor $\alpha$ depends on the noise level. The larger $\alpha$ is selected to be, the better the stability with respect to the influence of noise, although the unbiasedness will deteriorate with increasing $\alpha$. Therefore the correction factor e is matched with the respective receiving situation. For example, the input noise may be estimated by way of the received level, in case of a low incoming-signal level greater noise is assumed and hence the factor $\alpha$ is selected to be correspondingly larger. For a noise component of up to 30%, $\alpha$ is between 0 and 1. In case of low noise very small values for $\alpha$ will already suffice in order to desensitize the method against these interferences (for a 1% noise component $\alpha = 0.001$).

When the described improvement is used, the resulting matrix according to FIG. 4d will immediately be stored in the memory of the measurement receiver, the matrix having been formed by computation of the initially established matrix S. Thereby the subsequent calculation of the pulse response is facilitated.

According to a further embodiment of the method of the present invention the complex pulse response $\vec{h}$ is calculated according to the formula: $\vec{h} = S^{*T}(S \cdot S^{*T} + N \sigma^2 E)^{-1} \cdot \vec{e}$. For this formula the matrix S and the transposed complex conjugate matrix $S^{*T}$ are determined; additionally the number N of the columns of the matrix S is determined (in the example of the matrix S given above, N=88); and the standard deviation $\sigma$ of the input noise is determined. For this the input noise at the receiver is measured which has a symmetrically Gaussian distribution of the real and imaginary portion. The standard deviation $\sigma$ of this symmetrical Gaussian distribution is calculated from this measured input noise according to known mathematics (for instance see I. N. Bronstein, K. S. Semendjajew, Taschenbuch der Mathematik B. S. B., B. G. Teubner Verlagsgesellschaft, Leipzig 1985). E is again diagonally dominant identity matrix. By this formula the errors due to noise in the received signal are compensated and optimum noise suppression is achieved.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for determining a complex pulse response $\vec{h}$ of a radio channel, comprising the steps of:

from a selected signal portion of a wanted signal for transmission via the radio channel, determining a matrix S of said selected signal portion at a transmitter end of the radio channel from one of preset data of said selected signal portion and sample values obtained by sampling said selected signal portion;

storing, at a receiver end of the radio channel, the matrix S;

transmitting the wanted signal from the transmitter end to the receiver end via the radio channel;

at the receiver end of the radio channel determining a vector $\vec{e}$ of said selected signal portion of the wanted signal received at the receiver end by sampling said selected signal portion; and calculating the pulse response by linear transformation in accordance with the following relationship:

$$\vec{h} = (S^{*T} \cdot S)^{-1} \cdot S^{*T} \cdot \vec{e}$$

where $S^{*T}$ is a transposed complex conjugate matrix of the matrix S stored at the receiver end.

2. The method as claimed in claim 1, wherein a correction factor $\alpha$ with a diagonally dominant matrix E is inserted in the calculation of the pulse response in accordance with the relationship:

$$\vec{h} = (S^{*T} \cdot S + \alpha E)^{-1} \cdot S^{*T} \cdot \vec{e}$$

3. The method as claimed in claim 1, wherein for determining the pulse response of a radio channel of a digital mobile radio network, a training sequence signal portion of the mobile radio network is used as said selected signal portion.

4. The method as claimed in claim 1, wherein said radio channel is a channel in a digital mobile radio network.

5. The method as claimed in claim 2, wherein said diagonally dominant matrix is an identity matrix.

6. A method for determining a complex pulse response $\vec{h}$ of a radio channel in a digital mobile radio network, comprising the steps of:

from a training sequence signal portion of a wanted signal for transmission via the radio channel, determining a matrix S of said signal portion at a transmitter end of the radio channel;

storing, at a receiver end of the radio channel, the matrix S;

transmitting the wanted signal from the transmitter end to the receiver end via the radio channel;

at the receiver end of the radio channel determining a vector $\vec{e}$ that is representative of said signal portion of the wanted signal received at the receiver end; and calculating the pulse response by linear transformation in accordance with the following relationship:

$$\vec{h} = (S^{*T} \cdot S)^{-1} \cdot S^{*T} \cdot \vec{e}$$

where $S^{*T}$ is a transposed complex conjugate matrix of the matrix S stored at the receiver end.

7. The method as claimed in claim 6, wherein a correction factor $\alpha$ with a diagonally dominant matrix E is inserted in the calculation of the pulse response in accordance with the relationship:

$$\vec{h} = (S^{*T} \cdot S + \alpha E)^{-1} \cdot S^{*T} \cdot \vec{e}$$

8. The method as claimed in claim 7, wherein said diagonally dominant matrix is an identity matrix.

9. The method as claimed in claim 6, wherein said matrix S is determined from preset data of said signal portion.

10. The method as claimed in claim 6, wherein said matrix S is determined from sample values determined by sampling said signal portion.

11. A method for determining a complex pulse response $\vec{h}$ of a radio channel, comprising the steps of:

from a selected signal portion of a wanted signal for transmission via the radio channel, determining a matrix S of said selected signal portion at a transmitter end of the radio channel;

storing, at a receiver end of the radio channel, the matrix S;

transmitting the wanted signal from the transmitter end to the receiver end via the radio channel;

at a receiver end of the radio channel determining a vector $\vec{e}$ that is representative of said signal portion of the wanted signal received at the receiver end; and calculating the pulse response by linear transformation in accordance with the following relationship:

$$\vec{h} = (S^{*T} \cdot S + \alpha E)^{-1} \cdot S^{*T} \cdot \vec{e}$$

where $S^{*T}$ is a transposed complex conjugate matrix of the matrix S stored at the receiver end, where $\alpha$ is a correction factor and where E is a diagonally dominant matrix.

12. The method as claimed in claim 11, wherein for determining the pulse response of a radio channel of a digital mobile radio network, a training sequence signal portion of the mobile radio network is used as said selected signal portion.

13. The method as claimed in claim 11, wherein said diagonally dominant matrix is an identity matrix.

14. The method as claimed in claim 11, wherein said matrix S is determined from preset data of said signal portion.

15. The method as claimed in claim 11, wherein said matrix S is determined from sample values determined by sampling said signal portion.

16. A method for determining a complex pulse response $\vec{h}$ of a radio channel, comprising the steps of:

from a selected signal portion of a wanted signal for transmission via the radio channel, determining a matrix S of said selected signal portion at a transmitter end of the radio channel from one of preset data of said selected signal portion and sample values obtained by sampling said selected signal portion;

storing, at a receiver end of the radio channel, the matrix S;

transmitting the wanted signal from the transmitter end to the receiver end via the radio channel;

at a receiver end of the radio channel, determining the vector $\vec{e}$ of said selected signal portion of the wanted signal received at the receiver end by sampling said selected signal portion; and calculating the pulse response by linear transformation in accordance with the following relationship:

$$\vec{h} = S^{*T}(S \cdot S^{*T} + N\sigma^2 E)^{-1} \cdot \vec{e}$$

where $S^{*T}$ is a transposed complex conjugate matrix of the matrix S stored at the receiver end, N is the number of columns in the matrix S, $\sigma$ is a standard deviation of input noise and E is a diagonally dominant matrix.

17. The method as claimed in claim 16, wherein said radio channel is a channel in a digital mobile radio network.

18. The method as claimed in claim 16, wherein said diagonally dominant matrix is an identity matrix.

19. The method as claimed in claim 16, wherein for determining the pulse response of a radio channel of a digital mobile radio network, a training sequence signal portion of the mobile radio network is used as said selected signal portion.

* * * * *